United States Patent
Muthulingam et al.

(10) Patent No.: US 7,886,124 B2
(45) Date of Patent: Feb. 8, 2011

(54) METHOD AND MECHANISM FOR IMPLEMENTING DYNAMIC SPACE MANAGEMENT FOR LARGE OBJECTS

(75) Inventors: Sujatha Muthulingam, Sunnyvale, CA (US); Amit Ganesh, San Jose, CA (US); Dheeraj Pandey, Santa Clara, CA (US); Niloy Mukherjee, Belmont, CA (US); Wei Zhang, Foster City, CA (US); Krishna Kunchithapadam, Portland, OR (US)

(73) Assignee: Oracle International Corporation, Redwood Shores, CA (US)

( * ) Notice: Subject to any disclaimer, the term of this patent is extended or adjusted under 35 U.S.C. 154(b) by 348 days.

(21) Appl. No.: 11/830,590

(22) Filed: Jul. 30, 2007

(65) Prior Publication Data

US 2009/0037499 A1     Feb. 5, 2009

(51) Int. Cl.
*G06F 12/00* (2006.01)
*G06F 13/00* (2006.01)

(52) U.S. Cl. .............. 711/170; 711/100; 711/154; 711/167; 707/205

(58) Field of Classification Search ............ 714/3, 714/5–9; 707/200–206; 710/20–28; 711/100, 711/111–114, 117–119, 154, 167, 169–170
See application file for complete search history.

(56) References Cited

U.S. PATENT DOCUMENTS

| | | | |
|---|---|---|---|
| 6,076,151 A * | 6/2000 | Meier .................... | 711/171 |
| 6,173,313 B1 | 1/2001 | Klots et al. | |
| 6,192,377 B1 | 2/2001 | Ganesh et al. | |
| 6,295,610 B1 | 9/2001 | Ganesh et al. | |
| 6,353,828 B1 | 3/2002 | Ganesh et al. | |
| 6,493,726 B1 | 12/2002 | Ganesh et al. | |
| 6,510,421 B1 | 1/2003 | Ganesh et al. | |
| 6,574,717 B1 * | 6/2003 | Ngai et al. .................. | 711/147 |
| 6,631,374 B1 | 10/2003 | Klein et al. | |
| 6,647,510 B1 | 11/2003 | Ganesh et al. | |
| 6,684,223 B1 | 1/2004 | Ganesh et al. | |
| 6,714,943 B1 | 3/2004 | Ganesh et al. | |
| 6,728,719 B1 | 4/2004 | Ganesh et al. | |
| 6,728,831 B1 * | 4/2004 | Bridge ..................... | 711/112 |
| 6,772,176 B1 | 8/2004 | Saha et al. | |
| 6,804,672 B1 | 10/2004 | Klein et al. | |
| 6,854,046 B1 * | 2/2005 | Evans et al. ................ | 711/203 |
| 6,957,236 B1 | 10/2005 | Ganesh et al. | |
| 6,961,729 B1 | 11/2005 | Toohey et al. | |
| 6,961,865 B1 | 11/2005 | Ganesh et al. | |
| 6,976,022 B2 | 12/2005 | Vemuri et al. | |
| 6,981,004 B2 | 12/2005 | Ganesh et al. | |

(Continued)

OTHER PUBLICATIONS

Oracle Database Concepts; Cyran et al.; Oracle; Dec. 2003.*

(Continued)

*Primary Examiner*—Tuan V. Thai
(74) *Attorney, Agent, or Firm*—Vista IP Law Group, LLP

(57) ABSTRACT

Disclosed is a system and method for implementing space management for large objects stored in the computing system. According to some approaches, storage of large objects are managed by dynamically creating contiguous chunks of storage space of varying lengths. The length of each chunk may vary depending upon object size being stored, fragmentation of the storage space, available free space, and/or expected length of the object.

39 Claims, 14 Drawing Sheets

U.S. PATENT DOCUMENTS

| | | |
|---|---|---|
| 6,983,286 B1 | 1/2006 | Sinha et al. |
| 7,010,529 B2 | 3/2006 | Klein et al. |
| 7,047,386 B1 | 5/2006 | Ngai et al. |
| 7,133,941 B2 | 11/2006 | Klein et al. |
| 7,155,427 B1 | 12/2006 | Prothia et al. |
| 7,237,147 B2 | 6/2007 | Ganesh et al. |
| 7,240,065 B2 | 7/2007 | Yang et al. |
| 7,249,152 B2 | 7/2007 | Muthulingam et al. |
| 7,251,660 B2 | 7/2007 | Yang et al. |
| 7,277,900 B1 | 10/2007 | Ganesh et al. |
| 7,284,109 B1 * | 10/2007 | Paxie et al. ............... 711/173 |
| 7,334,004 B2 | 2/2008 | Ganesh et al. |
| 7,346,690 B1 | 3/2008 | Sinha et al. |
| 7,401,084 B1 | 7/2008 | Sinha et al. |
| 7,415,466 B2 | 8/2008 | Ganesh et al. |
| 7,418,544 B2 | 8/2008 | Mukherjee et al. |
| 7,437,525 B2 | 10/2008 | Yang et al. |
| 7,480,662 B2 | 1/2009 | Potapov et al. |
| 7,499,953 B2 | 3/2009 | Krishnaswamy et al. |
| 7,526,508 B2 | 4/2009 | Tan et al. |
| 7,552,149 B2 | 6/2009 | Sinha et al. |
| 7,571,173 B2 | 8/2009 | Yang et al. |
| 7,574,419 B2 | 8/2009 | Krishnaswamy et al. |
| 2002/0194206 A1 | 12/2002 | Ganesh et al. |
| 2003/0028722 A1 * | 2/2003 | Bachmat et al. ............. 711/112 |
| 2003/0031176 A1 * | 2/2003 | Sim ........................... 370/392 |
| 2003/0220951 A1 | 11/2003 | Muthulingam et al. |
| 2004/0054643 A1 | 3/2004 | Vemuri et al. |
| 2004/0054644 A1 | 3/2004 | Ganesh et al. |
| 2004/0177099 A1 | 9/2004 | Ganesh et al. |
| 2005/0004936 A1 | 1/2005 | Potapov et al. |
| 2005/0015563 A1 | 1/2005 | Yang et al. |
| 2005/0050109 A1 | 3/2005 | Klein et al. |
| 2005/0055385 A1 | 3/2005 | Sinha et al. |
| 2005/0055492 A1 | 3/2005 | Muthulingam et al. |
| 2005/0114409 A1 | 5/2005 | Sinha et al. |
| 2005/0120062 A1 | 6/2005 | Sinha et al. |
| 2005/0120064 A1 | 6/2005 | Sinha et al. |
| 2005/0125573 A1 | 6/2005 | Klein et al. |
| 2005/0240633 A1 | 10/2005 | Krishnaswamy et al. |
| 2005/0256829 A1 | 11/2005 | Yang et al. |
| 2005/0256849 A1 | 11/2005 | Krishnaswamy et al. |
| 2005/0256897 A1 | 11/2005 | Sinha et al. |
| 2005/0262110 A1 | 11/2005 | Gu et al. |
| 2005/0278350 A1 | 12/2005 | Yang et al. |
| 2005/0278359 A1 | 12/2005 | Yang et al. |
| 2006/0122963 A1 | 6/2006 | Klein et al. |
| 2006/0129779 A1 * | 6/2006 | Cannon et al. ............... 711/170 |
| 2006/0149791 A1 | 7/2006 | Sinha et al. |
| 2006/0212492 A1 | 9/2006 | Jacobs et al. |
| 2007/0083566 A1 | 4/2007 | Krishnaswamy et al. |
| 2007/0088912 A1 | 4/2007 | Mukherjee et al. |
| 2007/0130616 A1 | 6/2007 | Ng et al. |
| 2007/0136819 A1 | 6/2007 | Ng et al. |
| 2007/0288529 A1 | 12/2007 | Ganesh et al. |
| 2008/0098045 A1 | 4/2008 | Radhakrishnan et al. |
| 2008/0098083 A1 | 4/2008 | Shergill et al. |
| 2008/0098236 A1 | 4/2008 | Pandey et al. |
| 2008/0114963 A1 * | 5/2008 | Cannon et al. ............... 711/170 |
| 2008/0144079 A1 | 6/2008 | Pandey et al. |
| 2008/0183686 A1 | 7/2008 | Bhattacharyya et al. |
| 2008/0243865 A1 | 10/2008 | Hu et al. |
| 2008/0281846 A1 | 11/2008 | Hoang et al. |
| 2009/0024578 A1 | 1/2009 | Wang et al. |
| 2009/0030956 A1 | 1/2009 | Zhang et al. |
| 2009/0037366 A1 | 2/2009 | Shankar et al. |
| 2009/0037495 A1 | 2/2009 | Kumar et al. |
| 2009/0037498 A1 | 2/2009 | Mukherjee et al. |
| 2009/0106281 A1 | 4/2009 | Marwah et al. |
| 2009/0157701 A1 | 6/2009 | Lahiri et al. |
| 2009/0164525 A1 | 6/2009 | Krishnaswamy et al. |
| 2009/0205011 A1 | 8/2009 | Jain et al. |
| 2009/0205012 A1 | 8/2009 | Jain et al. |

OTHER PUBLICATIONS

"SQL Server 2000 Backup and Restore". http://technet.microsoft.com/en-us/library/cc966495.aspx.

"Microsoft SQL Server 2000 Enters Production, Ships to Early Adopters". http://www.microsoft.com/presspass/press/2000/Aug00/SQLServerPR.mspx.

* cited by examiner

METHOD AND MECHANISM FOR IMPLEMENTING DYNAMIC SPACE MANAGEMENT FOR LARGE OBJECTS

BACKGROUND

Some embodiments of the invention relate to computing systems, and in particular, to space management for objects stored in the computing system.

Modern database systems have been developed to handle many different data types, including non-traditional data types such as images, text, audio, and video data. Such non-traditional data types are often stored as "large objects" (LOBs) in the database system. LOBs may be of any size, but are often much larger than traditional data types. For example, LOBs in some database systems may span anywhere from 1 Kbyte to many Gbytes in size.

Because of their size, LOBs often cannot be efficiently handled with the same techniques used to handle traditional data types. The size of LOBs could result in space management difficulties within the database system. Given this size issue with LOBs, the specific techniques used to handle storage and disk management tasks for LOBs could have a very significant impact upon the performance of the database system, e.g., with respect to system I/O and space utilization.

One possible approach for performing space management for large objects is to divide the available storage space into equal sized pages. The size of the page would be configured at the LOB creation time. Every I/O operation would be bounded by this size limit. The problem with this approach is that LOBs be associated with storage of objects having different sizes, and therefore one value for the page size may not be suitable for all object sizes.

For example, consider if the LOBs are stored with a relatively large page size. The advantage of the larger page size is that large LOBs may see an increase in I/O latency performance proportional to the size of the LOB. However, there are also significant disadvantages since the large page size could cause a significant waste of storage space for smaller LOBs.

Consider if the LOBs are stored with a relatively small page size. The advantage of the smaller page size is that less storage space will be wasted, since smaller LOBs will better fit the page size. However, this approach will more likely result in larger LOBS being split apart to fit into multiple separate pages. This could cause fragmentation and a decrease in I/O latency performance.

Another possible approach is to allow users to manually alter the page size. However, this may present a manageability problem since approach is necessitated by having fairly sophisticated and well-trained users that will have to be aware of and able to adequately adjust additional storage parameters.

Based on the foregoing, it is clearly desirable to provide a method and mechanism to more efficiently management storage for large objects.

SUMMARY

Embodiments of the invention relate to methods, systems, and computer program products for implementing space management for large objects stored in the computing system. According to some embodiments, storage of large objects are managed by dynamically creating contiguous chunks of storage space of varying lengths. The length of each chunk may vary depending upon object size being stored, fragmentation of the storage space, available free space, and/or expected length of the object.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF DRAWINGS

The accompanying drawings are included to provide a further understanding of the invention and, together with the Detailed Description, serve to explain the principles of the invention. The same or similar elements between figures may be referenced using the same reference numbers.

DETAILED DESCRIPTION

Embodiments of the invention relate to methods, systems, and computer program products for implementing space management for large objects stored in the computing system. According to some embodiments, storage of large objects are managed by dynamically creating contiguous chunks of storage space of varying lengths. The length of each chunk may vary depending upon object size being stored, fragmentation of the storage space, available free space, and/or expected length of the object.

Figure 1:
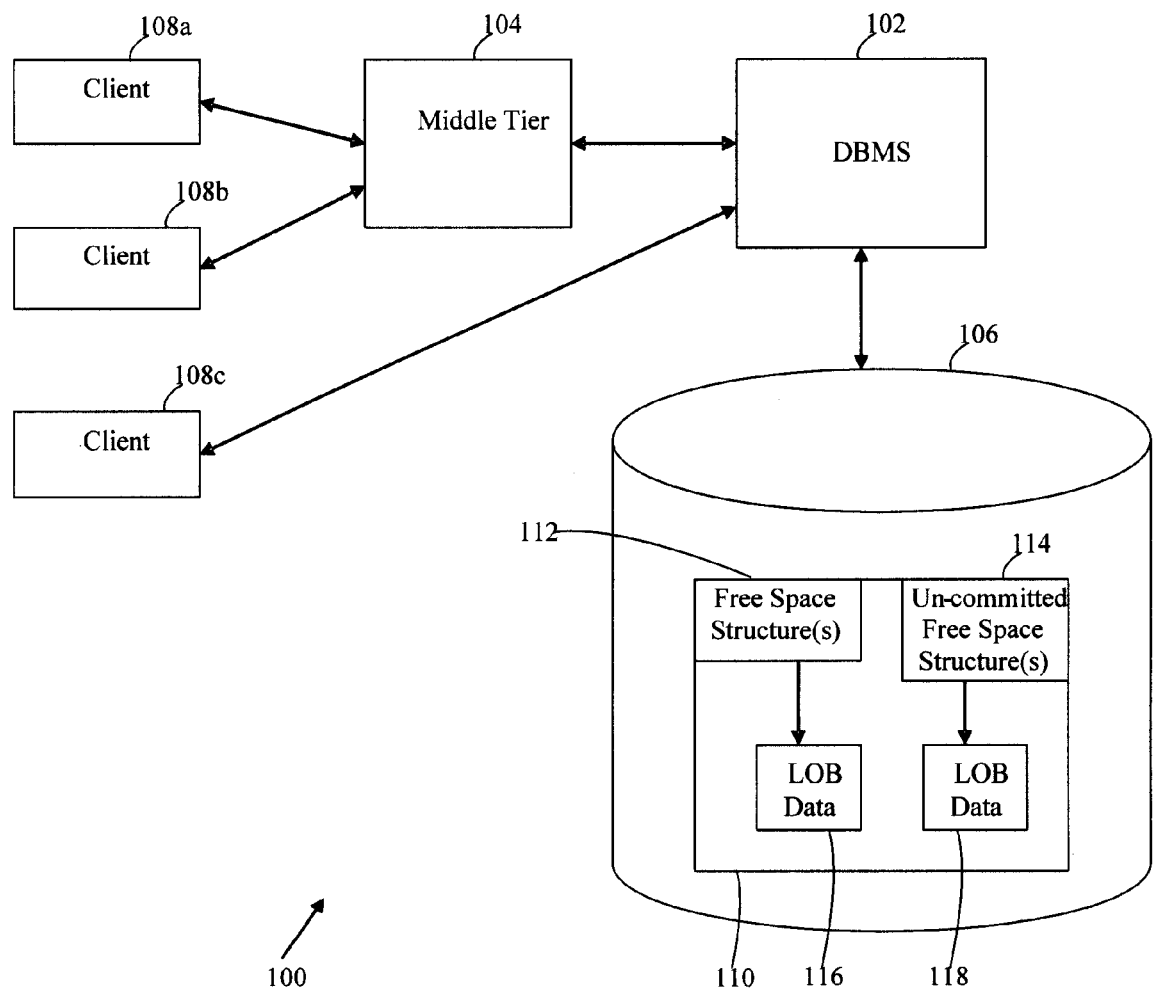
FIG. 1 illustrates an architecture for implementing an embodiment of the invention.

FIG. 1 illustrates the architecture 100 for implementing one embodiment of the invention. Architecture 100 includes a database management server (DBMS) 102 that is used to manage a database 106. Clients 108*a-c* may use the DBMS 102 to access the database 106, either directly or through one or more middle tier servers 104.

Within the database 106, objects may be stored on a storage device using one or more storage segments 110. Throughout this document, the invention may be described with respect using disk storage and disk drives as an illustrative, but a non-limiting, example of a storage device. Each storage segment is associated with a large number of chunks 116 and 118 to store the objects, e.g., LOB data. Each chunk is a contiguous portion of the storage system. A first structure 112 is used to track available free space within the segment 110. The first structure 112 can also be termed a "committed free space" (CFS) structure to the extent it represents free chunks that are guaranteed to correspond to already-committed transactions, and hence are available to be used by and allocated to other transactions. A second structure 114 is used to track space within the segment 110 that are not guaranteed to be associated with committed transactions, and hence are unavailable to be allocated to the extent they are already being used by a live, un-committed transaction. The second structure 114 can also be termed a "un-committed free space" (UFS) structure.

One key aspect of this embodiment is that the chunks 116 and 118 within a segment 110 may correspond to different sizes. In this way, objects can be stored within contiguous chunks in the segment that match as much as possible the exact size of the object being stored. This approach serves to significantly reduce fragmentation in the storage system. This also addresses the "one size fits all" problem of prior approaches that attempt to store all LOBs using the same fixed-sized pages. Any number of different and suitable sizes maybe used to allocate the chunks 116 and 118, spanning from very small chunks for smaller objects to much larger chunks for very large objects.

Another aspect of this embodiment is that the CFS and UFS structures are located within or associated with the same segment. This serves to increase the speed and efficiency of storage management and access since the system only needs to look at structures within a single segment to manage object storage. This is in contrast to alternative approaches that may require the storage system to look within multiple locations to perform these tasks, which could significantly decrease the speed and efficiency of the storage system.

Figure 2:
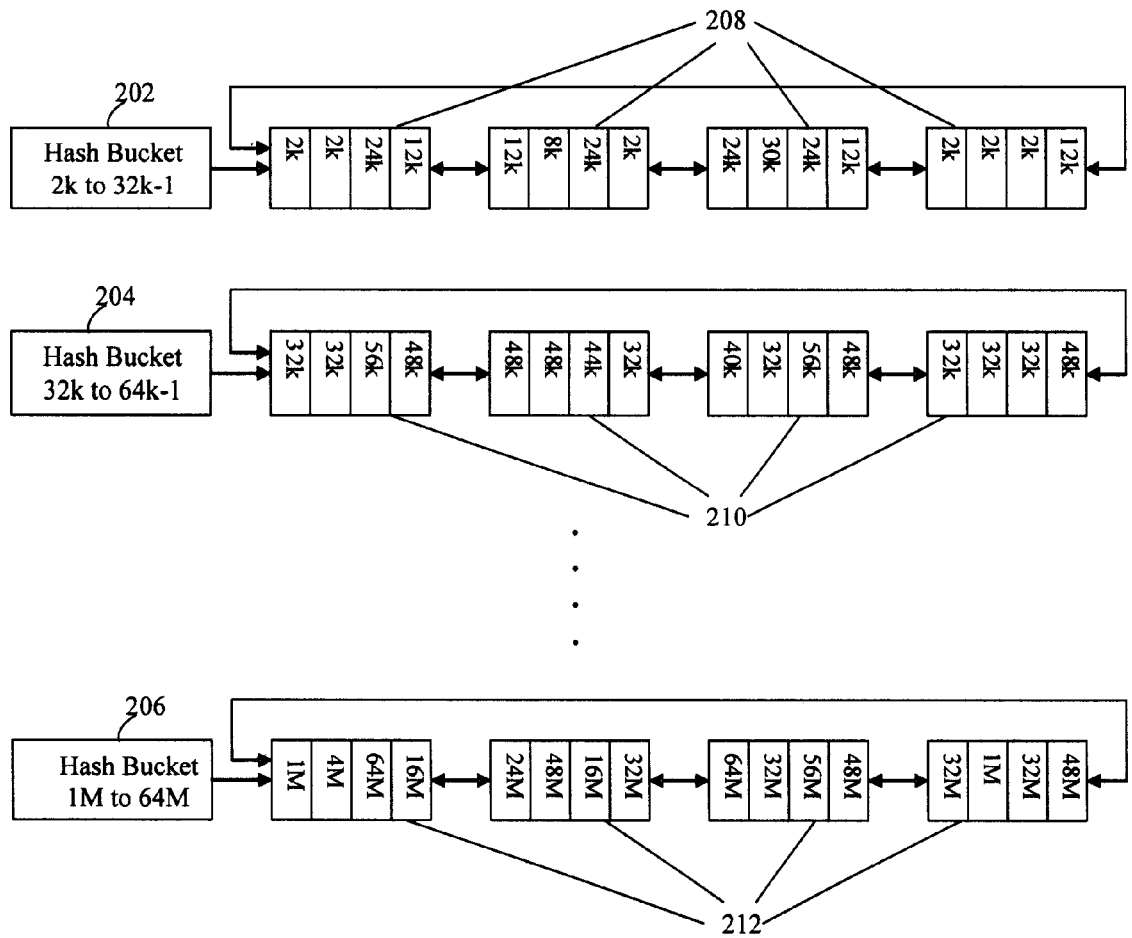
FIG. 2 shows an example free space structure according to some embodiments of the invention.

FIG. 2 illustrates an approach for implementing the CFS metadata structures according to one embodiment of the invention. A series of hash buckets is used to groups chunks together, with the different hash buckets used to track chunks of different sizes. Each hash bucket is associated with a range of similar sized chunks. Every chunk in the segment is tracked using at least one of the hash buckets. As noted previously, the chunks that are tracked with the CFS structures are all associated with already-committed transactions or are otherwise known to be available to be allocated and used by other transactions.

In the illustrative approach of FIG. 2, hash bucket 202 is associated with all the smaller chunks in the segment ranging from 2 Kbytes in size to 32 Kbytes-1 in size. A linked list 208 is maintained for hash bucket 202 to track the individual chunks in the segment within that size range that are free to be allocated and used. Each structure on the linked list 208 may be used to track multiple chunks, with the structure containing a link to the actual chunk itself. For chunks that are at the next larger set of size(s), hash bucket 204 is associated with chunks in the segment ranging from between 32 Kbytes in size to 64 Kbytes-1 in size. A linked list 210 is maintained for hash bucket 204 to track the individual chunks in the segment within that size range.

The series of hash buckets continues as appropriate for increasing sized groups of chunks until there are sufficient hash buckets to track all chunks in the segment. In the present example, the last hash bucket 206 is used to track chunks in the segment ranging from between 1 Mbytes in size to 64 Mbytes in size. This means that the largest chunk size allowed in this example system is 64 Mbytes in size. A linked list 212 is maintained for hash bucket 206 to track the individual chunks in the segment within that size range. It is noted that the specific ranges disclosed in FIG. 2 are merely illustrative, and it is expressly contemplated that different applications of the present invention may be employed with different and/or additional ranges of chunk values for the segment and CFS structures.

Figure 3:
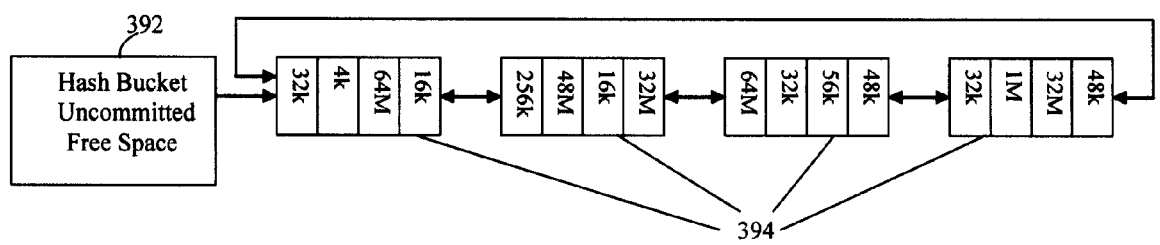
FIG. 3 shows an example for un-committed free space structure according to some embodiments of the invention.

FIG. 3 illustrates an approach for implementing the UFS metadata structure according to one embodiment of the invention. The example UFS structure corresponds to a hash bucket 392 associated with a linked list of structures 394 to track unavailable chunks in the segment. The UFS structure is designed to track all chunks in the segment that are not guaranteed to be available to be allocated and used.

For example, if a chunk is associated with a transaction that has not yet committed, then it will be tracked with the UFS structure. In some embodiments, it may be possible that a transaction has already committed, but due to different system delays that information is not yet known by the storage system. In this case, the chunk may actually be available to be re-allocated, but the storage system may not yet know the exact state of a particular chunk with regard to whether its associated transaction has or has not committed and therefore it is still listed with the UFS structure. A clean-up process may be employed to shift management of chunks for committed transactions from the UFS structure to the appropriate CFS structures.

It is noted that that in one embodiment, the UFS structure does not place the chunks into different groups based upon chunk size. Instead, chunks in the UFS structure are placed near other chunks that are associated with the same transaction. This approach is designed to optimize the clean-up process when a transaction commits, since all of the chunks associated with the same transaction will likely be re-allocated to the CFS structures at the same or similar time at or shortly after a commit.

Figure 4:
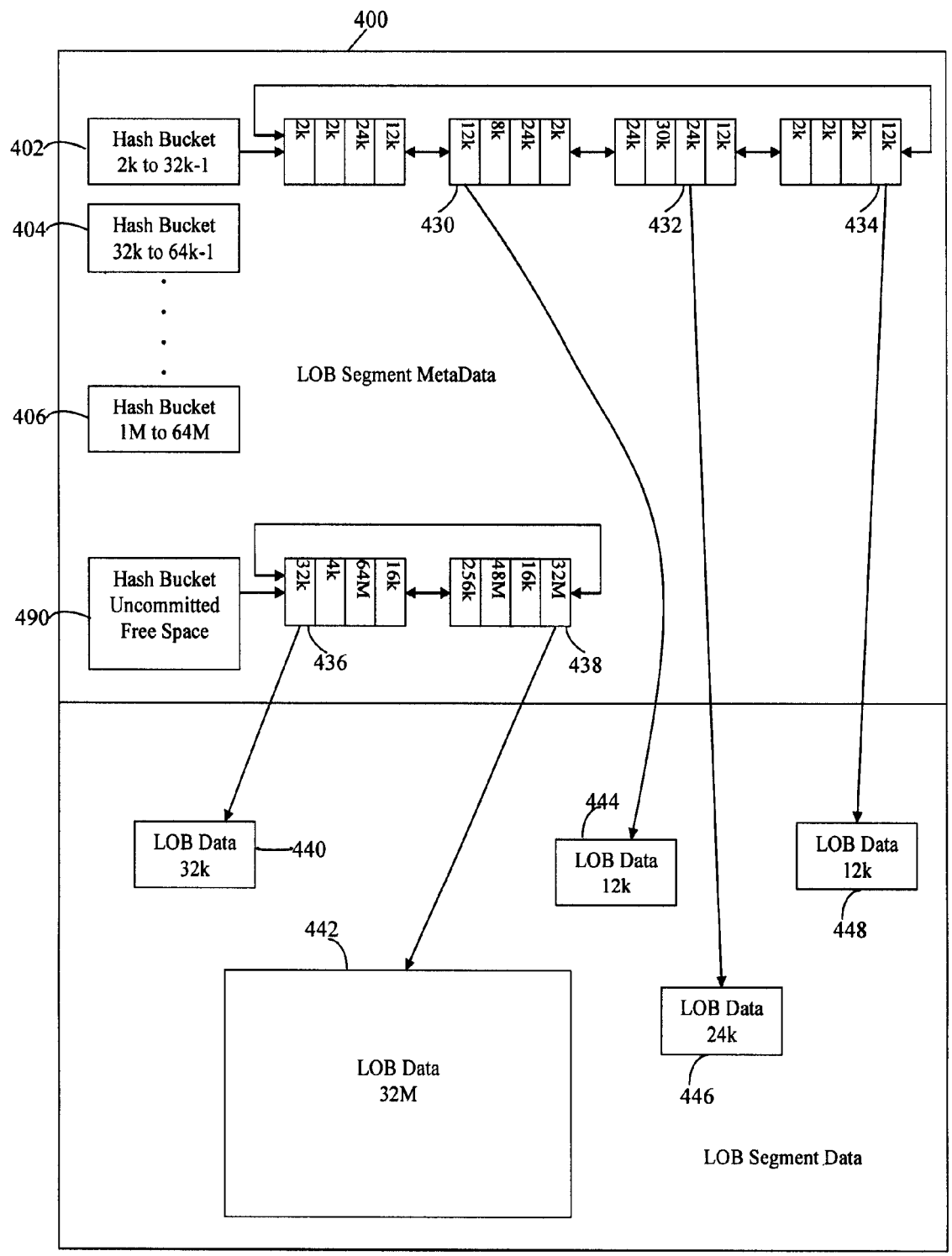
FIG. 4 illustrates an example segment according to some embodiments of the invention.

FIG. 4 shows the use of these structures to track chunks in an example segment 400. Assume that segment has been created with a large number of chunks, including chunks 440, 442, 444, 446, and 448.

Chunks 440 and 442 are not immediately available to be allocated, e.g., because they are associated with uncommitted transactions, with chunk 440 being 32 Kbyte in size and chunk 442 being 32 Mbyte in size. These chunks are tracked with UFS structure 490. In particular, UFS structure 490 is associated with a linked list having a structure 436 that corresponds and points to chunk 440. UFS structure 490 also includes a structure 438 that corresponds and points to chunk 442. Since these chunks 440 and 442 correspond to the UFS structure 490, these chunks will not automatically be allocated when there is a need for additional storage.

Chunks 444, 446, and 448 are available to allocated to new transactions, e.g., because they are associated with already-committed transactions, with chunk 444 being 12 Kbyte in size, chunk 446 being 24 Kbyte in size, and chunk 448 being 12 Kbyte in size. These chunks are tracked with CFS structures 402-406. In particular, CFS hash bucket 402 is employed to track available chunks that range from 2 Kbytes to 32 Kbytes-1 in size. CFS hash bucket 402 is associated with a linked list having a structure 430 that corresponds and points to chunk 444. This CFS hash bucket 402 also includes a structure 432 that corresponds and points to chunk 446 and a structure 434 that corresponds to and points to chunk 448. Since chunks 444, 446, and 448 are tracked with the CFS structures, these chunks will be automatically available to be allocated upon the need for additional storage.

Figure 5:
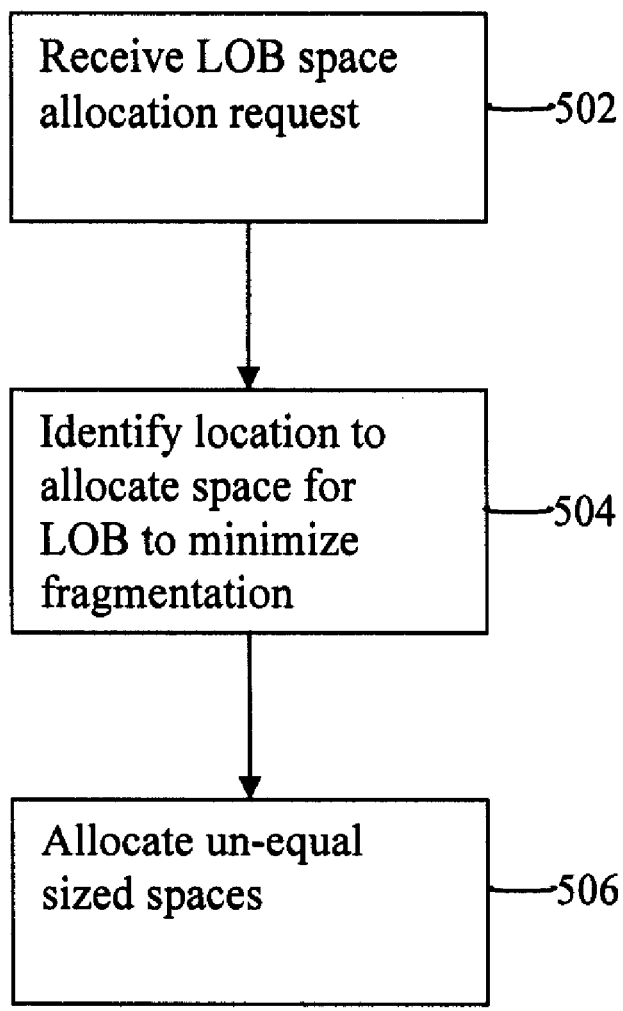
FIG. 5 shows a flow for a process for implementing space allocation according to some embodiments of the invention.
Figure 6:
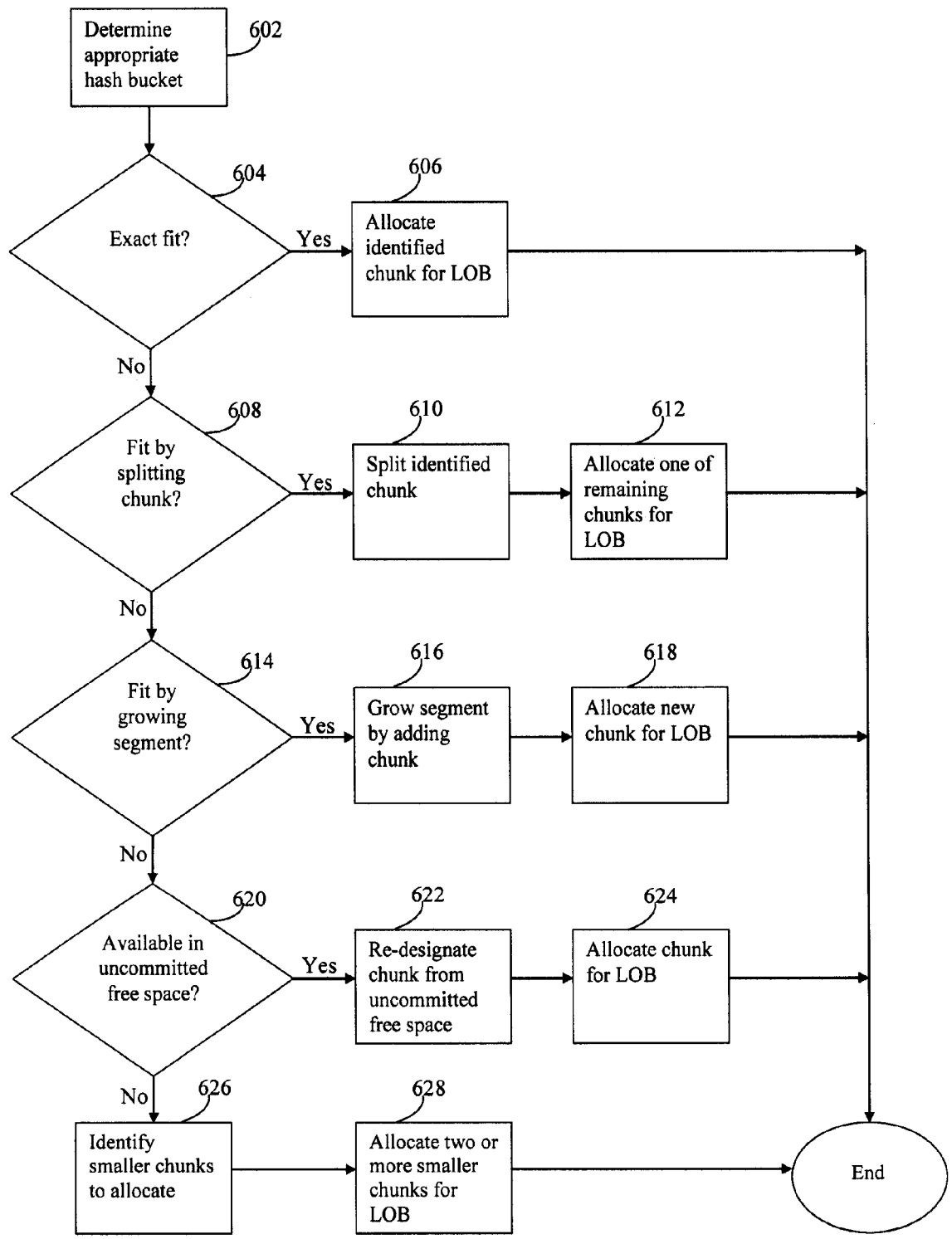
FIG. 6 shows a flow for a process for allocating space in a manner that minimized fragmentation according to some embodiments of the invention.

FIG. 5 shows a high-level flow of a process for implementing space allocation according to some embodiments of the invention. At 502, the space management system receives a LOB space allocation request. The request for space allocation may be for a LOB of any acceptable size, from a very small LOB to a LOB of a very significant size. At 504, the space management system identifies one or more locations within the segment in which to store the LOB, with the space identified in a way that minimizes fragmentation. The process shown and described with respect to FIG. 6 is one approach that can be taken to reduce fragmentation when performing space allocation. The spaces that are allocated within the storage system are allocated in un-equal sized chunks (506). Therefore, the segment may contain numerous chunks of many different sizes.

Figure 8A:
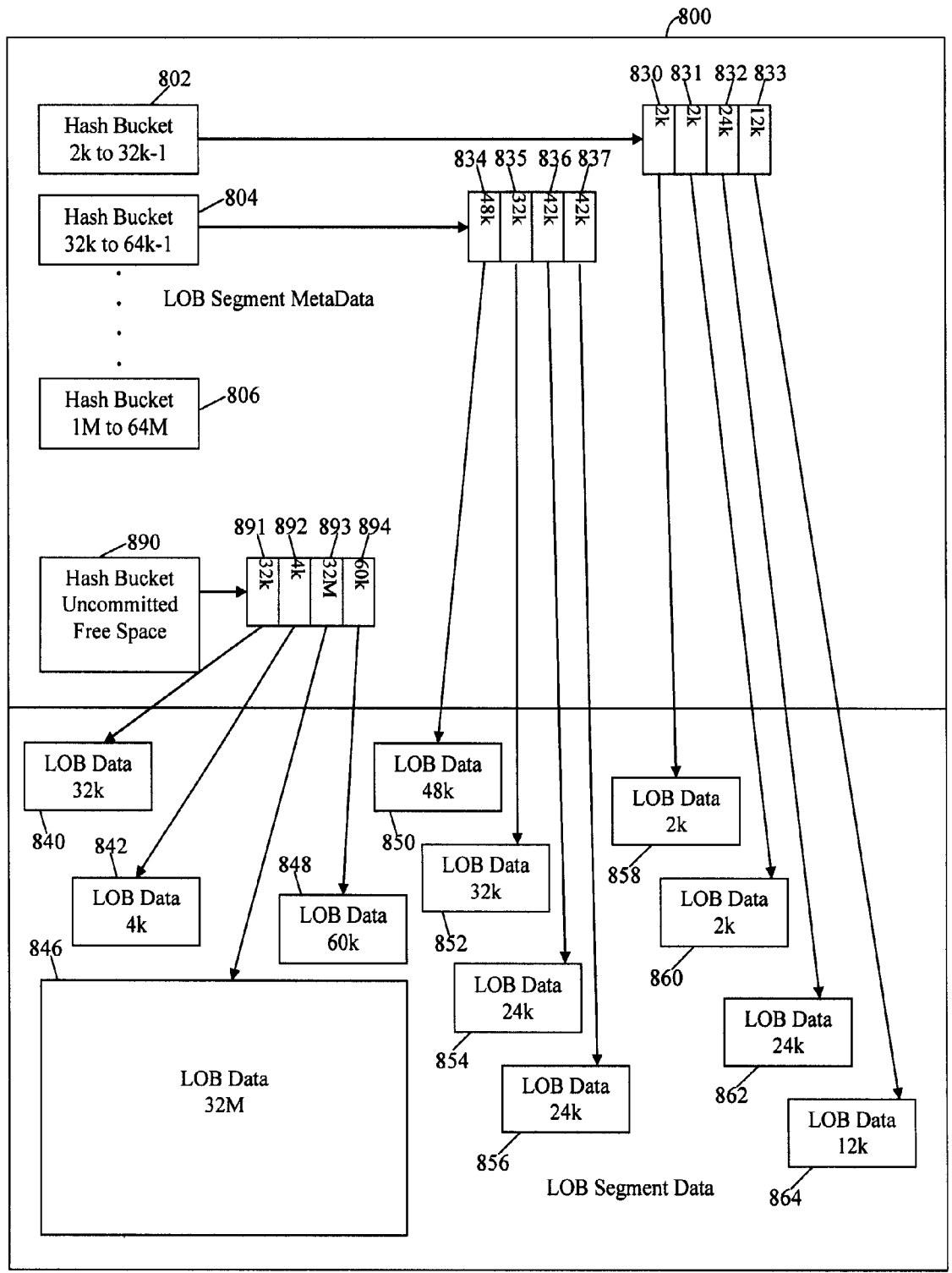
FIG. 8A illustrates another example segment according to some embodiments of the invention.

FIG. 6 shows a flow of a process for allocating space in the storage system based upon specific allocation request. The explanation of FIG. 6 will be made in conjunction with the example segment shown in FIG. 8A. FIG. 8A shows a segment 800 having a large number of chunks, including chunks 840, 842, 846, 848, 850, 852, 854, 856, 858, 860, 862, and 864. Chunks 840, 842, 846, and 848 are tracked with UFS structure 890. In particular, UFS structure 890 is associated with a linked list having a structure 891 that corresponds to chunk 840, a structure 892 that corresponds to chunk 842, a structure 893 that corresponds to chunk 846, and a structure 894 that corresponds to chunk 848. Chunks 850, 852, 854, 856, 858, 860, 862, and 864 are tracked with CFS structures 802-806. CFS hash bucket 802 is employed to track available chunks that range from 2 Kbytes to 32 Kbytes-1 in size. CFS hash bucket 802 is associated with a linked list having a structure 830 that corresponds and points to chunk 858, a structure 831 that corresponds to chunk 860, a structure 832 that corresponds to chunk 862, and a structure 833 that corresponds to chunk 864. CFS hash bucket 804 is employed to track available chunks that range from 32 Kbytes to 64 Kbytes-1 in size. CFS hash bucket 804 is associated with a linked list having a structure 834 that corresponds and points to chunk 850, a structure 835 that corresponds to chunk 852, a structure 836 that corresponds to chunk 854, and a structure 837 that corresponds to chunk 856.

Referring to FIG. 6, the space allocation process is assumed to have received a space allocation request for a LOB, such as action 502 from FIG. 5. At 602, the process identifies the appropriate hash bucket within the CFS structures that corresponds to the size of the LOB for which the space allocation is requested. At 604, a determination is made whether there is an available chunk tracked by the CFS structure which exactly matches the size of the LOB. If so, then the identified chunk is allocated and used to store the LOB data (606).

Figure 8B:
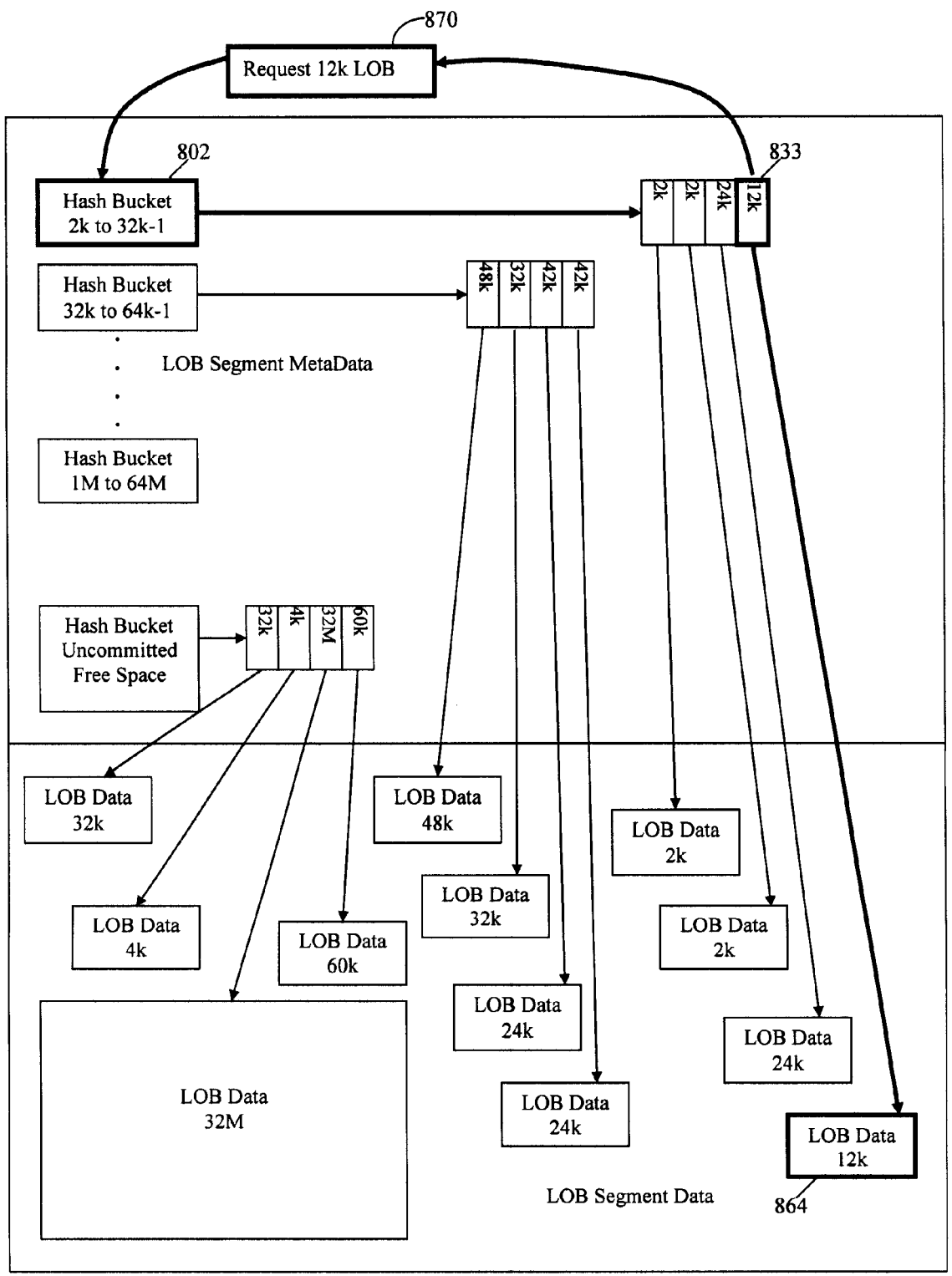
FIG. 8B-F illustrate space allocation processes according to some embodiments of the invention.

This process is illustrated in FIG. 8B, which is based upon the segment 800 shown in FIG. 8A. Assume that a space allocation request 870 is received to store a LOB corresponding to a size of 12 Kbytes. The space management system first identifies the appropriate CFS hash bucket that corresponds to the LOB size. Since the LOB is 12 Kbytes in size, hash bucket 802 is the appropriate hash bucket in CFS structures to search for an available chunk. Structures in the linked list associated with hash bucket 802 are searched for a free chunk having an exact size fit for the LOB. In the present example, structure 833 can be identified which corresponds to a free chunk 864 that is exactly 12 Kbytes in size. As such, this chunk will be allocated to store the LOB pursuant to request 870.

In some embodiments, the space allocation check for an exact size fit for the LOB is performed only within a single metadata listing within the linked list of the CFS structure. In an alternate embodiment, some or all of the linked list can be traversed along the list to find a chunk having an exact size match for the LOB.

Returning back to FIG. 6, if the process cannot find a free chunk having an exact size match for the size of the LOB to be stored (604), then an attempt will be made to create such an exact fit by splitting a free chunk of a larger size. At 608, a determination is made regarding whether a free chunk can be found which is suitable to be split. If so, then at 610 the identified chunk is split as appropriate to create a new free chunk which is an exact fit in size for the LOB to be stored. Once the new free chunk has been created of appropriate size, the LOB is stored into that new chunk (612).

Figure 8C:
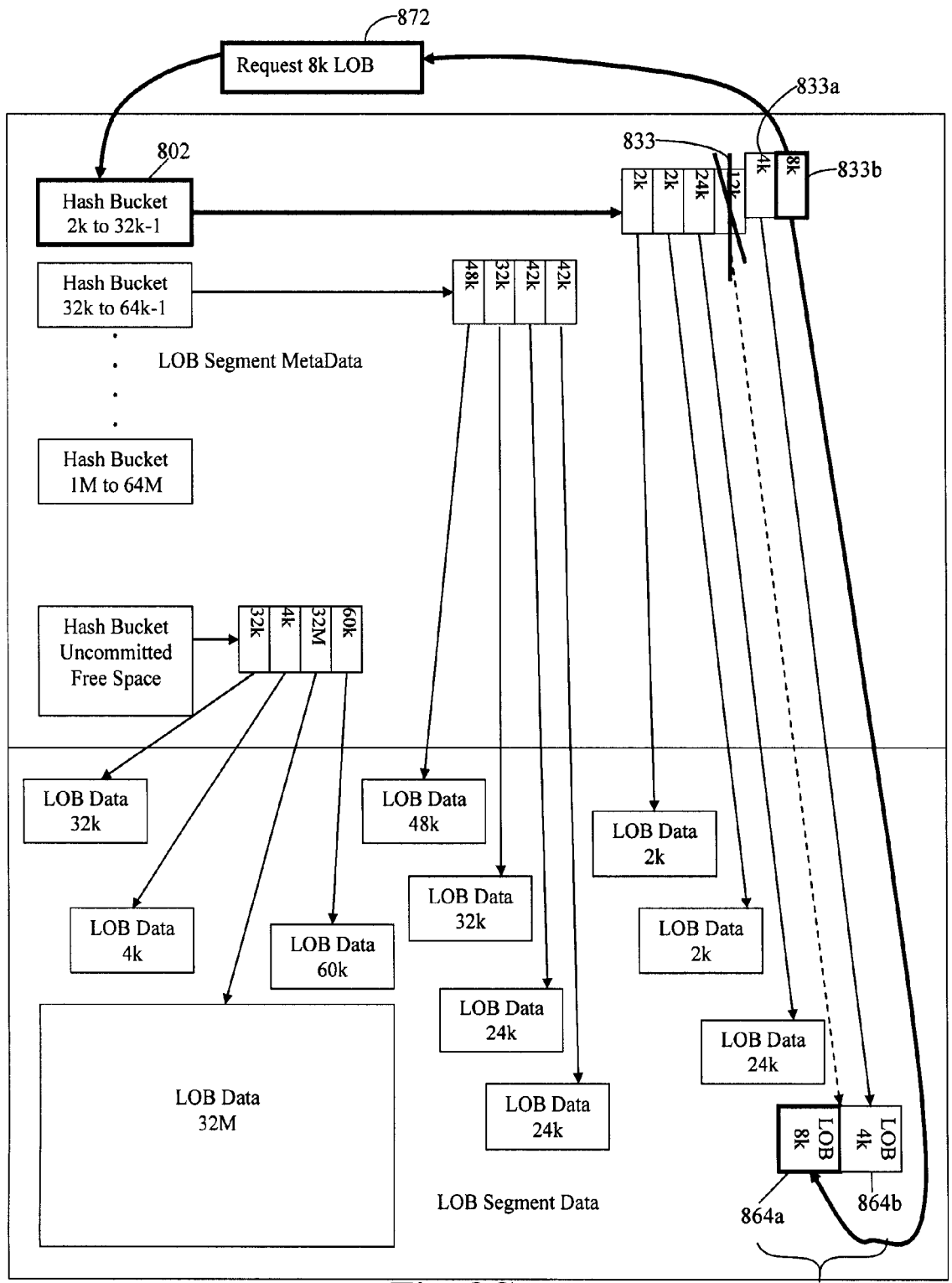

This process is illustrated in FIGS. 8A and 8C. Assume that a space allocation request 872 is received for the segment 800 of FIG. 8A to store a LOB the size of 8 Kbytes. Here, it can be seen that there are no free chunks in FIG. 8A with the exact-fit size of 8 Kbytes. This can be determined by the space management system by traversing the linked list associated with hash bucket 802 of the CFS structure, and in this example the linked list does not correspond to any structures associated with a chunk of 8 Kbytes in size.

As a result, the space management system will determine whether any of the free chunks that are available can be split to create a new 8 Kbyte chunk. In the present example, structure 833 is identified which corresponds to a free chunk 864 that is 12 Kbytes in size, which is large enough to split to create a new 8 Kbyte portion. The chunk 864 will be split as shown in FIG. 8C to create two new chunks 864a and 864b. New chunk 864a is 8 Kbytes in size and new chunk 864b is 4 Kbytes in size. These new chunks correspond to structures 833a and 833b, respectively, in the linked list for hash bucket 802. The space management system will then allocate and use new chunk 864a to satisfy the request 872 to store the new LOB.

Returning back to FIG. 6, if the process cannot find a free chunk having an exact size match (604) and cannot perform splitting to find a match (608), then an attempt can be made to create such an exact fit by growing the segment to create a new chunk of the appropriate size. At 614, a determination is made regarding whether the segment can be expanded to create a new chunk having the correct size to store the LOB. This option may not be available if, for example, the disk space is not sufficiently large to allow expansion of the segment or if the disk space does not contain sufficient contiguous free space. If, however, the segment can be grown by the appropriate amount, then at 616 the segment is expanded to create a new free chunk which is an exact fit in size for the LOB to be stored. Once the new free chunk has been created of appropriate size, the LOB is stored into that new chunk (618).

Figure 8D:
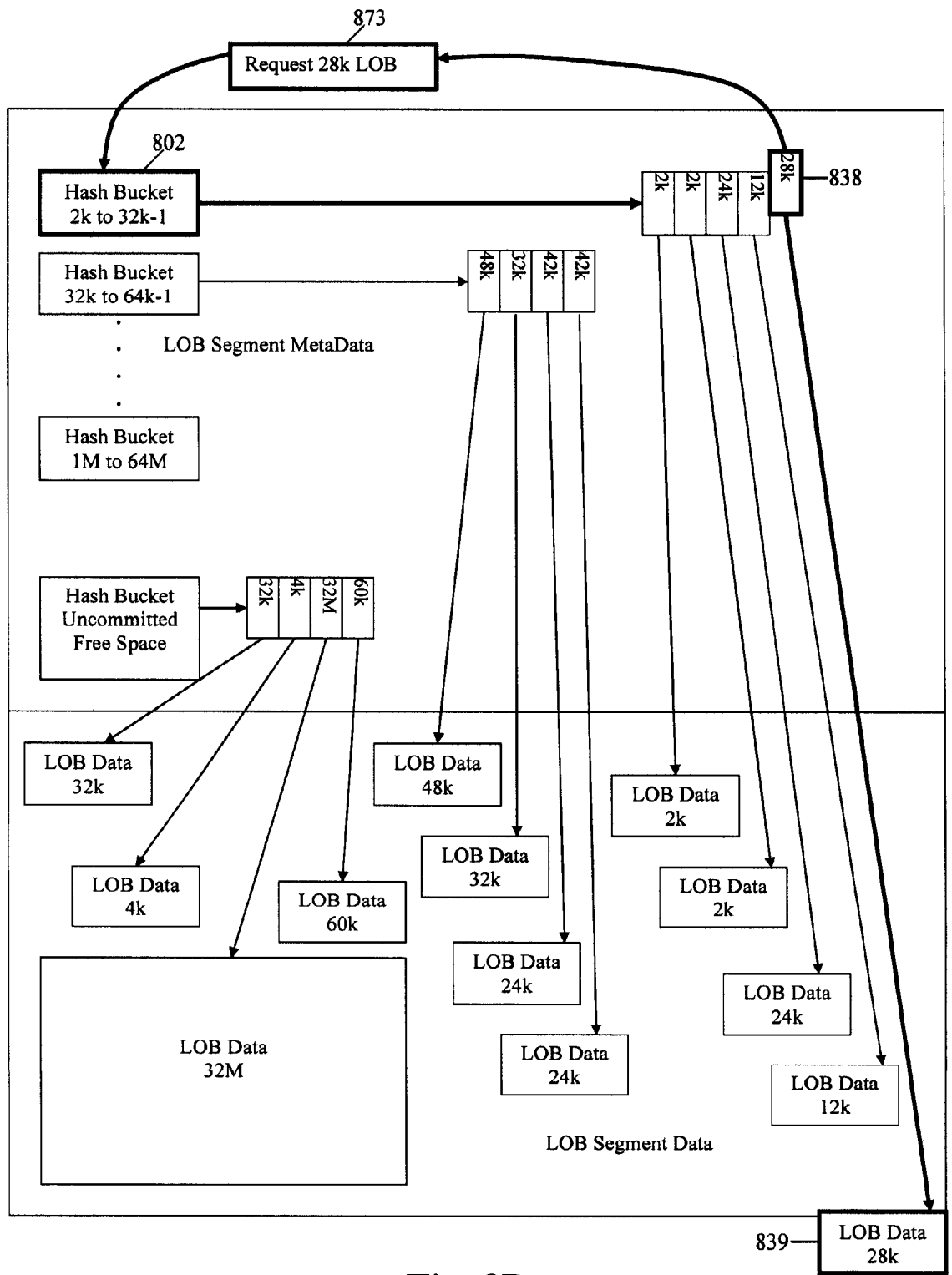

This process is illustrated based upon FIGS. 8A and 8D. Assume that a space allocation request 873 is received to store a LOB the size of 28 Kbytes in the segment 800 shown in FIG. 8A. Here, it can be seen that there are no free chunks with the exact-fit size of 28 Kbytes. This can be determined by the space management system by traversing the linked list associated with hash bucket 802 of the CFS structure, in which the linked list does not correspond to any structures associated with a chunk of 28 Kbytes in size. Further assume that the system cannot or will not allow any of the larger free chunks to be split to create a new free chunk of 28 Kbytes in size, or that such larger free chunks are not available.

As a result, the space management system will determine whether the segment can be expanded to add a new 28 Kbyte chunk to satisfy the request 873. In the present example, the segment is expanded to include a new free chunk 839 as shown in FIG. 8D. The new free chunk is exactly 28 Kbytes in size to fit the new LOB. This new chunk corresponds to structure 838 in the linked list for hash bucket 802. The space management system will then allocate and use new chunk 839 to satisfy the request 873 to store the new LOB having the 28 Kbyte size.

Returning back to FIG. 6, the storage management system may also attempt a search of the UFS structure to determine whether there are any free chunks of the appropriate size tracked by the UFS structure that are actually available to be used for space allocation. As previously stated, the UFS structure tracks chunks which cannot be guaranteed to be available for space allocation. This may be because chunks tracked by the UFS structure are being used by an un-committed transaction and hence cannot be re-allocated since it is possible that the un-committed transaction may need to be rolled back, thus requiring data in the chunk(s). However, depending upon particular implementation approaches, it may be possible that some of the chunks tracked by the UFS structure actually correspond to committed transactions but are still associated with the UFS structure because scheduled clean-up processes have not yet been taken action to re-designate the chunks to the CFS structures. Under certain circumstances, it may be desirable to find and use these free chunks for space allocation to store new LOBs.

At 620, a determination is made regarding whether there are any free chunks of the appropriate size tracked by the UFS structure that are actually available to be used for space allocation. If so, then at 622 the identified chunk is re-designated as being available for allocation. The LOB can then be stored into the re-designated chunk (624).

Figure 8E:
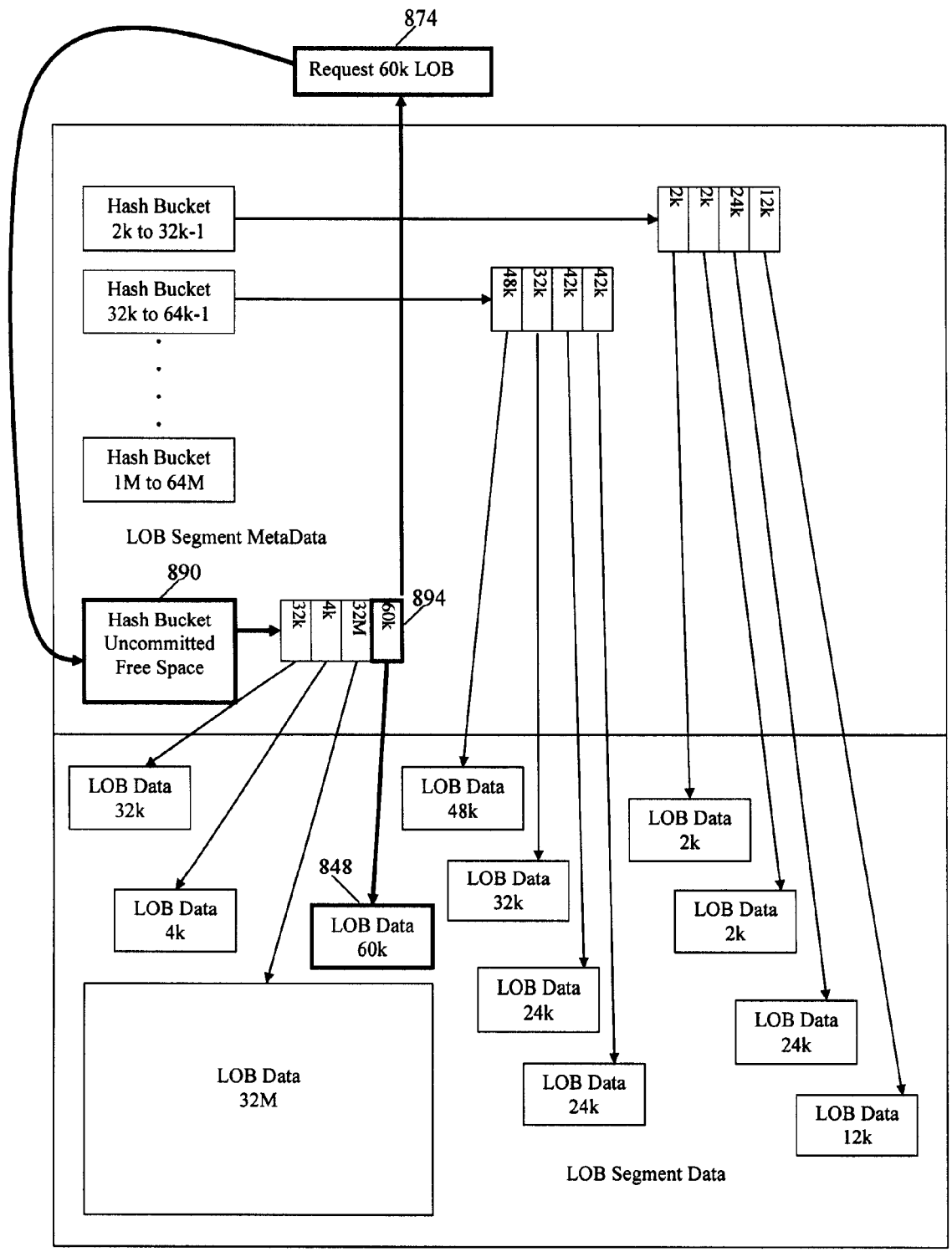

This process is illustrated in FIG. 8E, which is based upon the segment 800 shown in FIG. 8A. Assume that a space allocation request 874 is received to store a LOB corresponding to a size of 60 Kbytes. It is further assumed that none of the other described approaches can suitably be used to store the 60 Kbyte LOB. The space management system may engage in the process to identify a suitable chunk from the UFS structure. The linked list associated with the UFS structure 890 is searched for a free chunk having an exact size fit for the LOB. A chunk of the appropriate size, i.e., chunk 848, can be found by searching though the linked list and following structure 894. The structure of the correct size can be analyzed to determine if it is actually associated with a committed transaction. In the present example, it is assumed that chunk 848 having a size of 60 Kbytes is actually a free chunk associated with a committed transaction, even though it is being tracked by the UFS structure 890. As such, this chunk will be allocated to satisfy request 870.

Referring back to FIG. 6, it is possible that there are no suitable approaches to provide a free chunk of the exact correct size for space allocation to store the LOB. As previously stated, the goal of some embodiments is to provide as much as possible an exact fit for a chunk to store the LOB in the interests of minimizing fragmentation. However, there is always the possibility none of the previously described approaches can suitably be used to provide such an exact fit for a free chunk. Therefore, it is possible that multiple smaller free chunks are allocated to provide sufficient space to store the LOB.

At 626, the space management system identifies two or more free chunks that can be combined to provide enough space to store the LOB. In an embodiment, this action is preferably accomplished by identifying multiple contiguous free chunks. If multiple contiguous free chunks cannot be found, then multiple non-contiguous free chunks may be employed. At 628, the identified free chunks are allocated and used to store the LOB.

Figure 8F:
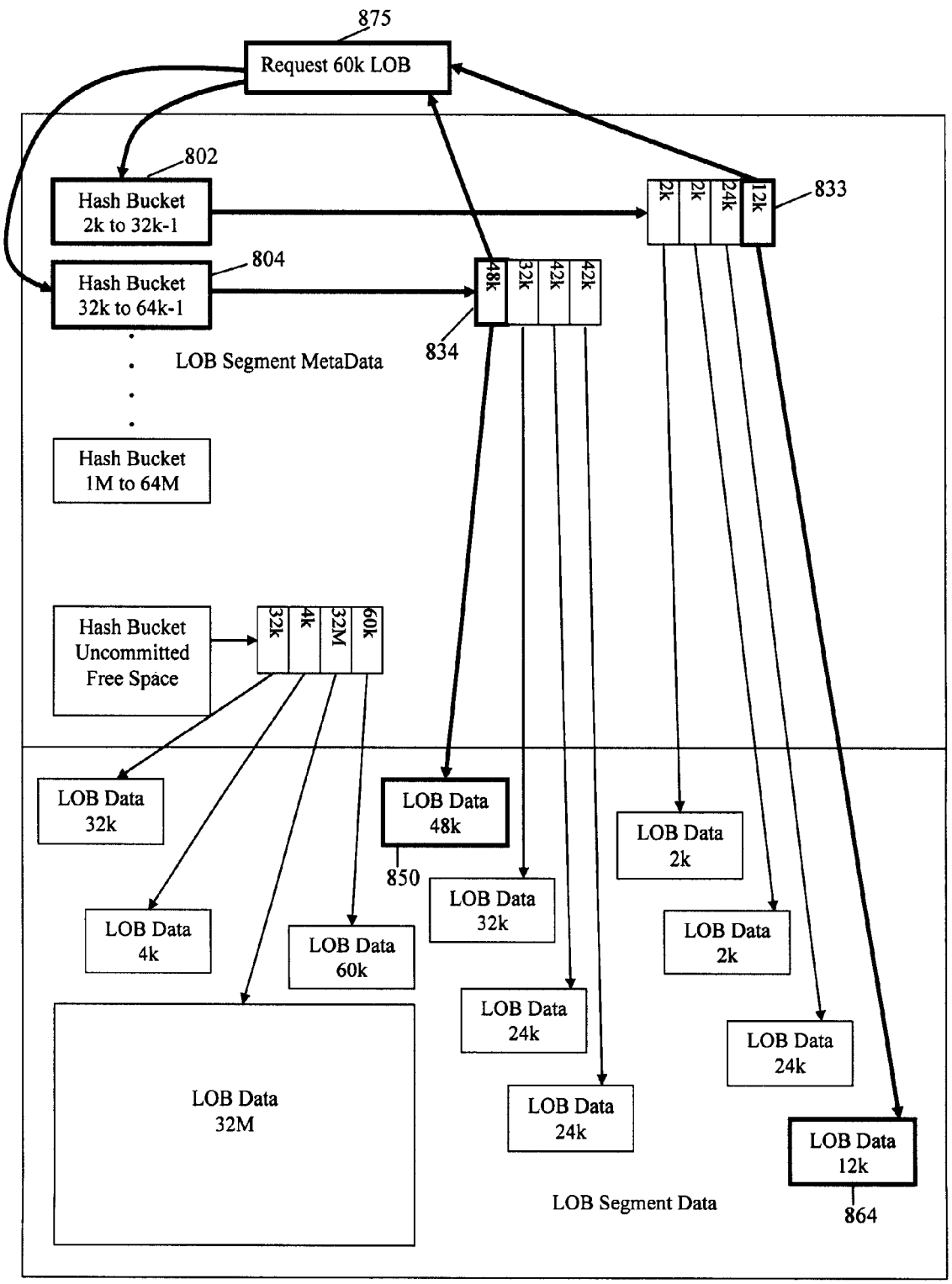

This process is illustrated as shown in FIGS. 8A and 8F. Assume that a space allocation request 875 is received to store a LOB the size of 60 Kbytes in the segment shown in FIG. 8A. Here, it can be seen that there are no free chunks with the exact-fit size of 60 Kbytes and it is further assumed that such a free chunk of 60 Kbytes cannot be created or added to the segment.

As a result, the space management system will determine whether there are multiple free chunks that can be combined together to store the 60 Kbyte LOB. In the present example, the free chunk 850 of size 48 Kbytes and the free chunk 864 of size 12 Kbytes can be combined together to form a space of the appropriate 60 Kbyte size. Therefore, these two free chunks are allocated and used to satisfy the request 875 to store the LOB.

Figure 7:
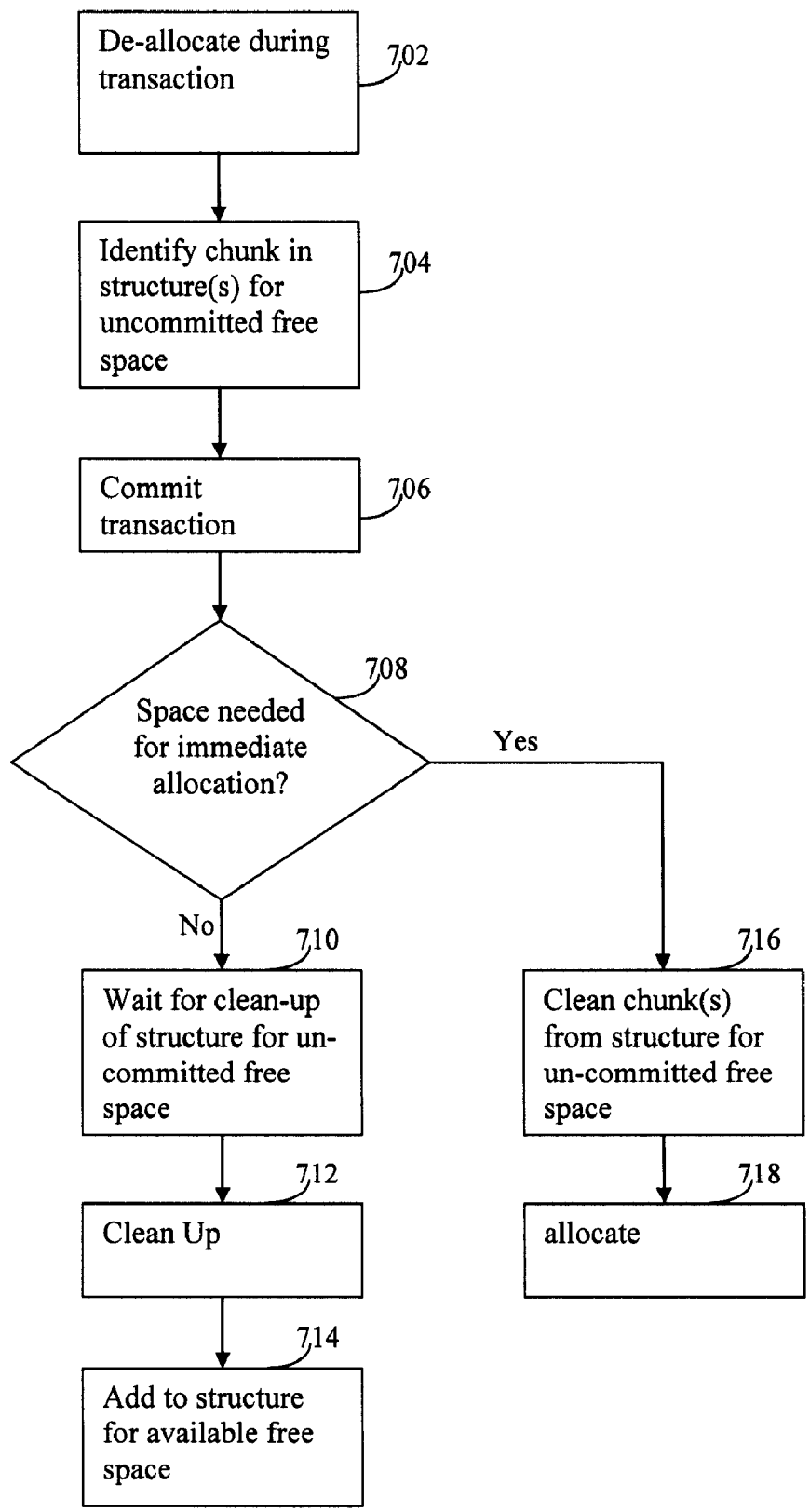
FIG. 7 shows a flow for a process for implementing space de-allocation according to some embodiments of the invention.

FIG. 7 shows a flow for a process to de-allocate storage space according to an embodiment of the invention. At 702, one or more LOBs are deleted or otherwise de-allocated in a manner that corresponds to de-allocation of their underlying storage. The process then, at 704, identifies the corresponding one or more chunks for the de-allocated LOB. Assume that the transaction associated with the storage commits at 706. The associated elements in the UFS structure is associated with information to indicate that the chunks now correspond to a committed transaction.

At this point, the chunks are still being tracked by the UFS structure even though it is associated with a committed transaction, and therefore can actually be considered a free chunk available to be re-allocated. However, a scheduled clean-up process may not have actually taken action yet to re-designate the chunk(s) to the CFS structures.

During this time period, it is possible that there is a need to immediately re-allocate the chunk(s) to satisfy a space allocation request (708). If so, then the chunk(s) are identified from the UFS structure (716) and used to allocate space for the new space allocate request (718).

Otherwise, the system will wait for the scheduled clean-up process to address the de-allocated chunk(s) (710). Clean up activities will occur as scheduled (712) and the chunks will be associated with the appropriate CFS structures (714).

System Architecture Overview

Figure 9:
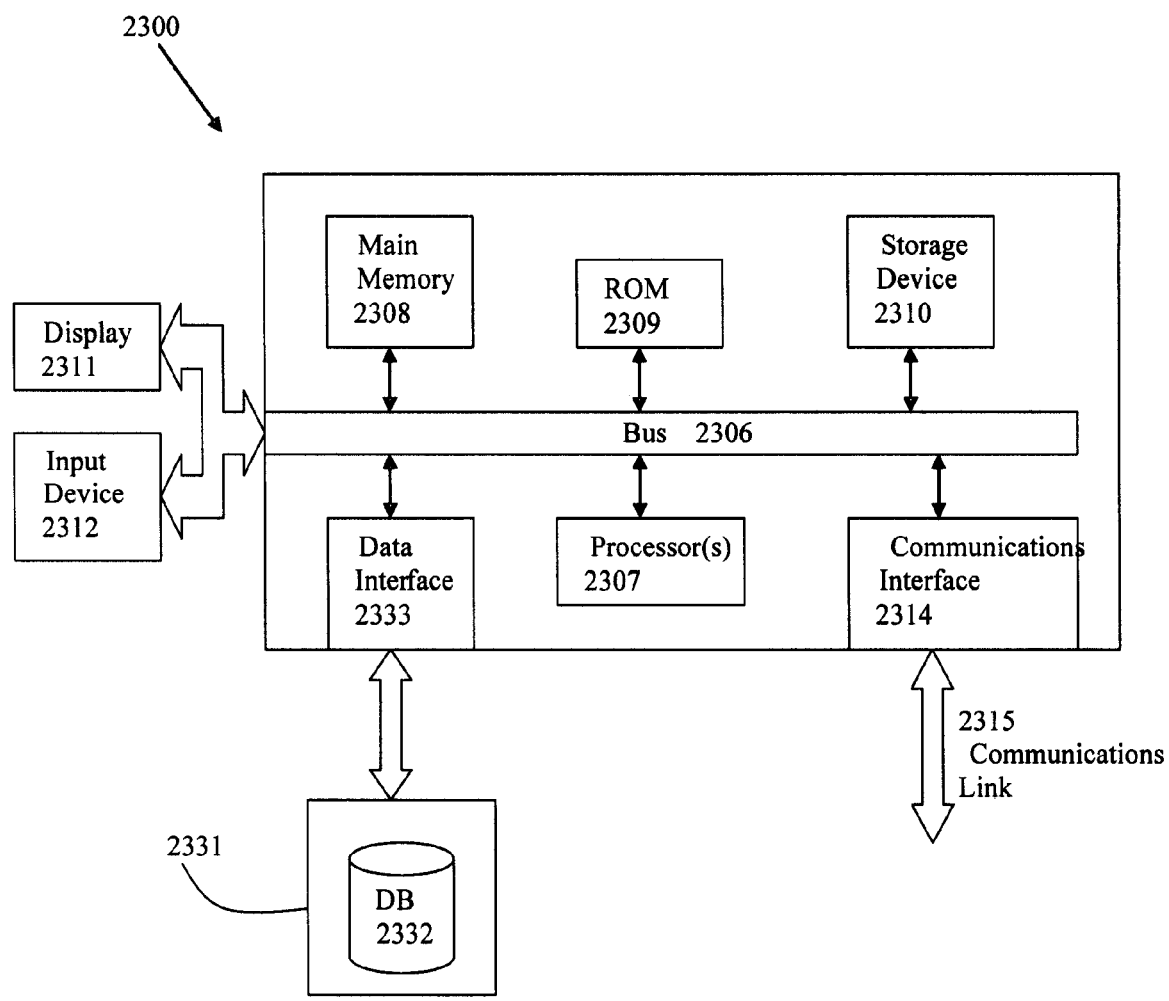
FIG. 9 illustrates an example computing architecture with which embodiments of the invention may be practiced.

FIG. 9 is a block diagram of an illustrative computing system 2300 suitable for implementing an embodiment of the present invention. Computer system 2300 includes a bus 2306 or other communication mechanism for communicating information, which interconnects subsystems and devices, such as processor 2307, system memory 2308 (e.g., RAM), static storage device 2309 (e.g., ROM), disk drive 2310 (e.g., magnetic or optical), communication interface 2314 (e.g., modem or Ethernet card), display 2311 (e.g., CRT or LCD), input device 2312 (e.g., keyboard), and cursor control.

According to one embodiment of the invention, computer system 2300 performs specific operations by processor 2307 executing one or more sequences of one or more instructions contained in system memory 2308. Such instructions may be read into system memory 2308 from another computer readable/usable medium, such as static storage device 2309 or disk drive 2310. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2307 for execution. Such a medium may take many forms, including but not limited to, non-volatile media and volatile media. Non-volatile media include, for example, optical or magnetic disks, such as disk drive 2310. Volatile media include dynamic memory, such as system memory 2308.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 2300. According to other embodiments of the invention, two or more computer systems 2300 coupled by communication link 2315 (e.g., LAN, PTSN, or wireless network) may perform the sequence of instructions required to practice the invention in coordination with one another.

Computer system 2300 may transmit and receive messages, data, and instructions, including program, i.e., application code, through communication link 2315 and communication interface 2314. Received program code may be executed by processor 2307 as it is received, and/or stored in disk drive 2310, or other non-volatile storage for later execution.

Computer system 2300 may transmit and receive messages, data, and instructions, including program, i.e., application code, through communication link 2315 and communication interface 2314. Received program code may be executed by processor 2307 as it is received, and/or stored in disk drive 2310, or other non-volatile storage for later execution. In an embodiment, the computer system 2300 operates in conjunction with a data storage system 2331, e.g., a data storage system 2331 that contains a database 2332 that is accessible by the computer system 2300. The computer system 2300 communicates with the data storage system 2331 through a data interface 2333. A data interface 2333, which is coupled to the bus 2306, transmits and receives electrical, electromagnetic or optical signals that include data streams representing various types of signal information, e.g., instructions, messages and data.

What is claimed is:

1. A computer implemented method for performing storage management for a computing system, comprising:
   receiving a space allocation request to store an object having a first size in a storage management system, in which
      the storage management system identifies or creates a plurality of storage units having a plurality of different sizes in a segment of a computer readable storage medium, and
      each of at least some of the plurality of storage units comprises a contiguous storage portion of the storage management system;
   searching a structure that tracks free space from the plurality of storage units in the segment, in which the act of searching the structure comprises:
      examining the structure to identify a contiguous storage unit which has a size that exactly matches the first size by using at least one processor,
      using the contiguous storage unit to fulfill the space allocation request if the contiguous storage unit with the size that exactly matches the first size is identified from the plurality of storage units, and
      creating the contiguous storage unit with the size that exactly matches the first size to fulfill the space allocation request if the contiguous storage unit is not identified from the plurality of storage units; and
   storing the object in the contiguous storage unit.

2. The method of claim 1 further comprising:
   searching the structure to identify a large storage unit having a large storage unit size that is larger than the first size;
   splitting the large storage unit into two or more smaller storage units;
   allocating one of the two or more smaller storage units to store the object; and
   storing the object in the allocated storage unit.

3. The method of claim 1 further comprising:
   expanding a segment to add a new storage unit having a new storage unit size that matches the first size;
   allocating the new storage unit to store the object; and
   storing the object in the new storage unit.

4. The method of claim 3 in which the plurality of contiguous storage units having different sizes are located within the segment.

5. The method of claim 1 further comprising:
   searching the structure that tracks the free space, which is unavailable, within the storage management systems, in which the structure is searched to identify a second structure storage unit having a second structure storage unit size that matches the first size but which is actually available for allocation even though it is tracked in the structure;
   allocating the second structure storage unit to store the object; and
   storing the object in the second structure storage unit.

6. The method of claim 5 in which the second structure storage unit corresponds to a committed transaction, and the second structure storage unit has not yet been re-designated to the structure.

7. The method of claim 5 in which the structure is located within a same segment.

8. The method of claim 5 in which the structure tracks storage units associated with uncommitted transactions.

9. The method of claim 8 in which storage units associated with the same uncommitted transactions are tracked with data structures that are located near each other within the structure.

10. The method of claim 1 in which the structure is associated with storage units corresponding to committed transactions.

11. The method of claim 1 in which the structure comprises multiple hash buckets, wherein each of the multiple hash buckets corresponds to a group of storage unit sizes.

12. The method of claim 11 in which a hash bucket is associated with a linked list of structures to track storage units within the group of storage unit sizes, wherein each link within the linked list corresponds to a plurality of storage units.

13. The method of claim 12 in which only a single link is searched within the linked list for a storage unit.

14. The method of claim 12 in which multiple links within the linked list is searched for a storage unit.

15. A system for performing storage management for a computing system, comprising:
   a storage system comprising a set of storage space for storing data in a segment of a computer readable storage medium; and
   a structure that tracks free space within the set of storage space from a plurality of different sized storage units with a plurality of different sizes in a segment of a computer readable storage medium that can be used to satisfy a space allocation request, in which
      the free space is organized into the plurality of different sized storage units,
      each of at least some of the plurality of different sized storage units comprises a contiguous storage portion of the storage system, and
      the structure is structurally configured to allow searching to identify the free space having a contiguous storage unit which has a size that exactly matches a storage allocation request to store an object having the first size, wherein
         the structure is first examined to identify the contiguous storage unit which has the size that exactly matches the first size, the contiguous storage unit with the size that exactly matches the first size is used to fulfill the storage allocation request if the contiguous storage unit is identified from the plurality of different sized storage units, and another contiguous storage unit which has the size that exactly matches the first size in the segment is created to fulfill the storage allocation request.

16. The system of claim 15 in which the structure is associated with storage units corresponding to committed transactions.

17. The system of claim 15 in which the structure comprises multiple hash buckets, wherein each of the multiple hash buckets corresponds to a group of storage unit sizes.

18. The system of claim 17 in which a hash bucket is associated with a linked list of structures to track storage units within the group of storage unit sizes, wherein each link within the linked list corresponds to a plurality of storage units.

19. The system of claim 18 in which only a single link is searched within the linked list for a storage unit.

20. The system of claim 18 in which multiple links within the linked list are searched for a storage unit.

21. The system of claim 15 in which the structure is searched to identify a second structure storage unit having a second structure storage unit size that matches the first size but which is actually available for allocation even though it is tracked in the structure.

22. The system of claim 21 in which the second structure storage unit corresponds to a committed transaction, and the second structure storage unit has not yet been re-designated to the structure.

23. The method of claim 15 in which the structure is located within a same segment.

24. The system of claim 15 in which the structure tracks storage units associated with uncommitted transactions.

25. The system of claim 24 in which storage units associated with the same uncommitted transactions are tracked with data structures that are located near each other within the structure.

26. A computer program product comprising a tangible computer usable storage medium having executable code to execute a process for performing storage management for a computing system, the process comprising:
receiving a space allocation request to store an object having a first size in a storage management system, in which the storage management system comprises a segment which comprises a plurality of storage units having a plurality of different sizes in the segment of a computer readable storage medium, and
each of at least some of the plurality of storage units comprises a contiguous storage portion of the storage management system;
searching a structure that tracks free space in the segment, in which the process for searching the structure comprises:
examining the structure to identify a contiguous storage unit which has a size that exactly matches the first size by using at least one processor,
using the contiguous storage unit to fulfill the space allocation request if the contiguous storage unit with the size that exactly matches the first size is identified from the plurality of storage units, and
creating the contiguous storage unit with the size that exactly matches the first size if the contiguous storage unit is not identified from the plurality of storage units; and
storing the object in the contiguous storage unit.

27. The computer program product of claim 26 further comprising:
searching the structure to identify a large storage unit having a large storage unit size that is larger than the first size;
splitting the large storage unit into two or more smaller storage units;
allocating one of the two or more smaller storage units to store the object; and
storing the object in the allocated storage unit.

28. The computer program product of claim 26 further comprising:
expanding a segment to add a new storage unit having a new storage unit size that matches the first size;
allocating the new storage unit to store the object; and
storing the object in the new storage unit.

29. The computer program product of claim 28 in which the plurality of contiguous storage units having different sizes are located within the segment.

30. The computer program product of claim 26 further comprising:
searching the structure that tracks the free space, which is unavailable, within the storage management systems, in which the structure is searched to identify a second structure storage unit having a second structure storage unit size that matches the first size but which is actually available for allocation even though it is tracked in the structure;
allocating the second structure storage unit to store the object; and
storing the object in the second structure storage unit.

31. The computer program product of claim 30 in which the second structure storage unit corresponds to a committed transaction, and the second structure storage unit has not yet been re-designated to the structure.

32. The computer program product of claim 30 in which the structure is located within a same segment.

33. The computer program product of claim 30 in which the structure tracks storage units associated with uncommitted transactions.

34. The computer program product of claim 33 in which storage units associated with the same uncommitted transactions are tracked with data structures that are located near each other within the structure.

35. The computer program product of claim 26 in which the structure is associated with storage units corresponding to committed transactions.

36. The computer program product of claim 26 in which the structure comprises multiple hash buckets, wherein each of the multiple hash buckets corresponds to a group of storage unit sizes.

37. The computer program product of claim 36 in which a hash bucket is associated with a linked list of structures to track storage units within the group of storage unit sizes, wherein each link within the linked list corresponds to a plurality of storage units.

38. The computer program product of claim 37 in which only a single link is searched within the linked list for a storage unit.

39. The computer program product of claim 37 in which multiple links within the linked list is searched for a storage unit.

* * * * *

UNITED STATES PATENT AND TRADEMARK OFFICE
CERTIFICATE OF CORRECTION

| | | |
|---|---|---|
| PATENT NO. | : 7,886,124 B2 | |
| APPLICATION NO. | : 11/830590 | |
| DATED | : February 8, 2011 | |
| INVENTOR(S) | : Muthulingam et al. | |

It is certified that error appears in the above-identified patent and that said Letters Patent is hereby corrected as shown below:

In column 9, line 9-15, below "one another." delete "Computer system 2300 may transmit and receive messages, data, and instructions, including program, i.e., application code, through communication link 2315 and communication interface 2314. Received program code may be executed by processor 2307 as it is received, and/or stored in disk drive 2310, or other non-volatile storage for later execution.".

In column 9, line 31, below "messages and data." insert -- In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. --, therefor.

Signed and Sealed this
Third Day of July, 2012

David J. Kappos
*Director of the United States Patent and Trademark Office*